2,977,300
METHOD OF PRODUCING HEAT-STABLE GREASES

Charles R. Bergen, Schenectady, N.Y., and William P. Scott, Richard M. Tillman, and Warren W. Woods, Ponca City, Okla., assignors to Continental Oil Company, Ponca City, Okla., a corporation of Delaware No Drawing. Filed Aug. 21, 1958, Ser. No. 756,301

7 Claims. (Cl. 252—18)

The present invention relates to improved grease compositions. More particularly, the present invention relates to improved soapless grease compositions, which possess improved stability in respect to the effects of heat.

Greases prepared by the use of the normal soap-forming ingredients, such as the acids derived from animal fats or vegetable oils, exhibit phase changes with increasing temperature up to a point at which the soap dissolves or at least forms a colloidal dispersion in the lubricating oil base with consequent loss of mechanical structure responsible for grease-like properties. Furthermore, these greases generally do not reform spontaneously upon cooling. As a result, such greases are unsuitable for use in the lubrication of bearings operated at elevated temperatures, such as those used in certain aircraft mechanisms and the like.

Several methods of preparing heat-stable greases have been proposed in the prior art. One proposal incorporates certain salts of aromatic acids in the grease composition such as sodium benzoate, which apparently forms complexes with the normal soap-forming acids. While these additives impart heat stability to the resulting grease, it is necessary to heat such grease compositions during the process of manufacture to a temperature of at least 500 to 600° F. This is a disadvantage because temperatures in this range involve fire hazards and promote oxidative degradation of the oil carrier. Another method heretofore proposed for the preparation of heat-stable greases involves the formation of an inorganic hydrogel and subsequently replacing the interstitial water contained in the gel with an oleaginous liquid vehicle. Two procedures have been suggested for the replacement of the interstitial water. In one, an aerogel is first formed by displacing the water with a solvent which is soluble in both water and oil. In the second procedure the hydrogel is heated in the presence of a surface-active agent dissolved in an oleaginous liquid vehicle; U.S. Patent 2,625,508 to Fred H. Stross describes this procedure. Whichever procedure is used, several disadvantages are inherent in the process, as, for example, a hydrogel is bulky and difficult to handle, the gel must be washed to remove salts, and hydrogels contain a large amount of water which must be removed.

It is, therefore, an object of the present invention to produce improved greases which obviate the disadvantages of the prior art. It is a special object of our invention to produce a grease for use at elevated temperatures. It is another object of the invention to produce a grease which will spontaneously recover its structure on cooling after being melted. Other objects will become apparent as the invention is hereinafter more thoroughly described.

In accordance with the present invention, greases of the above-described characteristics are obtained by following a process which involves two essential features. These features are:

(1) Formation of a colloidal dispersion of an oil-insoluble inorganic compound in an oleaginous liquid, wherein the cation of the inorganic compound is selected from the class consisting of the alkali and alkaline earth metals.

(2) The formation of the grease by adding to the colloidal dispersion-oleaginous liquid vehicle mixture a gel promoter or coupling agent.

The oleaginous liquid vehicle employed in these compositions may be a mineral lubricating oil obtained by any of the conventional refining procedures. Other oleaginous materials which may be used are vegetable oils, such as corn oil, cottonseed oil, castor oil, etc., and animal oils such as lard oil, sperm oil, etc. For some purposes, various synthetic oils may be employed with particular advantage, such as, for example, polyalkylene glycols, various high molecular weight esters, silicone polymer oil, etc.

In its broadest aspects, the invention comprises the formation of a colloidal dispersion of an inorganic material in an oleaginous liquid vehicle and then forming a grease by adding thereto a grease-forming gelling agent. The amount of inorganic material dispersed in the oleaginous liquid may vary by weight from a trace to about 70 parts, but preferably up to about 15 parts per 100 parts of oleaginous liquid depending upon the desired consistency of the finished grease. For convenience, we prefer to prepare a dispersion having a higher inorganic material content and then dilute the resulting mixture to the desired solids content.

The colloidal dispersions of the inorganic material in the oleaginous liquid vehicle may be prepared by various methods. Whatever method is used for preparing the dispersion of the inorganic material in the oil, the diameter of the individual particles of the inorganic solid must be less than 5 microns, preferably less than 0.5 micron. One such method is that disclosed by one of the present co-inventors, Woods, in his Canadian patent application Serial No. 650,431, filed July 7, 1953. Another method is that disclosed by Carlyle in the copending application, Serial No. 629,229, filed December 19, 1956, now U.S. Patent No. 2,937,991. Yet another method is that disclosed by Peter A. Asseff et al. in U.S. Patent 2,616,904, which disclosure is made a part of this application.

Briefly, the Woods application discloses a method of forming a stable oil dispersion of a basic water-soluble inorganic compound by first dissolving the inorganic solid compound in water at concentrations ranging up to saturation; emulsifying this aqueous solution in an oleaginous liquid vehicle containing as a dispersing agent an organic acid whose normal alkali and alkaline earth metal salts are oil soluble or an organic compound which upon hydrolysis yields such an acid; forming a finely divided water-in-oil emulsion; and then dehydrating the emulsion.

The Carlyle application teaches a method of dispersing solid basic inorganic salts in an oil phase by means of volatile organic solvents, the process of which may be described as comprising the steps of admixing at least one basically reacting organic metal compound, an organic acid compound of the type whose barium salts of the anion are oil soluble, mutual solvents for these compounds, and water to form a homogeneous mass, condensing in the homogeneous mass the basic oil insoluble inorganic salt, and subsequently removing the residual solvents and water therefrom. As above used, the descriptive terms for the organic acid and organic acid compounds, are meant for the purposes of this invention to include the oil-soluble free acids and salts thereof as well as organic compounds which, upon neutral or alkaline hydrolysis, yield oil-soluble acids or salts.

In brief, Asseff et al. teach a process whereby an alkaline earth metal organic complex may be prepared from an oil-soluble organic acid which complex contains in basic form an amount of metal substantially in excess of the stoichiometric amount required to form the normal metal salt. The complex for the purposes of this invention is substantially equivalent to dispersions as prepared by either the Woods or Carlyle methods.

Suitable coupling agents, or, as they are sometimes designated, grease-forming gelling agents, are organic acidic materials and include the following:

Itaconic acid
Pyromellitic acid
2-methyl adipic acid
3-tertiary butyl adipic acid
3-tertiary amyl adipic acid
Octyl adipic acid
Furoic acid
Mercapto succinic acid
2,3-dibromo succinic acid
5-methyl-4-cyclohexane-1,2-dicarboxylic acid
(m-Phenylenedioxy) diacetic acid
Benzylmalonic acid
Terephthalic acid
Thiodiglycolic acid While we do not wish to be bound by any particular theory as to how the coupling agents form grease-type gels when added to the inorganic dispersion, we believe that the correct explanation of their function is substantially as follows:

The coupling agent is added to the inorganic dispersion at a level by which it can only react with a portion of the dispersed particles. The metal salt of the coupling agent is formed, as indicated by the evolution of $CO_2$. The insoluble portion of the resultant gel is believed to be particles of the unreacted inorganic compound coated with the metal salt of the coupling agent. This is indicated by comparison of the electron micrographs of the inorganic dispersion prior to and after the reaction with the coupling agent. Specifically, when dispersed particles of calcium carbonate of approximately 1/25 micron diameter are reacted with 80 percent of the theoretical amount of organic acid necessary for neutralization, the resulting particles which form the grease structure are approximately 1/8 micron in diameter. These particles are believed to contain a core of calcium carbonate of a diameter equal to 1/2 of the original diameter which is coated with the calcium salt of the organic acid.

Generally, the mixture after the addition of the grease-forming gelling agent should be mildly heated to promote the reaction of the coupling agent with the dispersed inorganic base. Temperatures within the range of about 50 to 150° C. are satisfactory, but temperatures within the range of about 60 to 90° C. are preferred. If for any reason it becomes desirable to carry out the reaction at a lower temperature, this result can be facilitated by adding to the mixture a solvent for the grease-forming gelling agent. Suitable solvents include hydrocarbons, ketones, and alcohols. In some cases it may be beneficial to incorporate an oxidation inhibitor in the grease; and when such a procedure is followed, any of the oxidation inhibitors ordinarily used in lubricating oil may be employed.

The greases prepared in accordance with our invention require little or no mechanical working to develop structure and possess excellent thermal stability. In addition, these greases possess the remarkable ability of reforming to their initial structure upon cooling after being heated to a temperature above their dropping points. We have found that the consistency of these greases is practically independent of the type of oleaginous liquid vehicle contained in the grease, but is largely dependent upon the solids content and the amount of coupling agent used. The consistency of the grease is easily controlled by varying the amounts of either one or both of the latter two components in the product. Calcium base greases prepared according to our invention are particularly outstanding in that they can be made having A.S.T.M. dropping points of 400° F. or higher. Calcium base greases prepared in accordance to the methods of the prior art have dropping points in the order of 190° F.

In order to disclose the nature of the present invention still more clearly, the following illustrative examples will be given. It is to be understood that the invention is not to be limited to the specific conditions or details set forth in these examples except in so far as such limitations are specified in the appended claims. Parts given are parts by weight. In the examples, the numerical value preceding pale oil designates the viscosity at 100° F. in Saybolt seconds Universal. Base numbers were determined by the acetic acid titration method which utilizes glacial acetic acid as the solvent and a solution of perchloric acid in glacial acetic acid as the titrant. The method is especially adapted for determinations of this type since equilibria are obtained rapidly. The procedures for carrying out acetic acid titrations are generally outlined in Analytical Chemistry, volume 23, No. 2, February 1951, page 337, and volume 24, No. 3, March 1952, page 519.

As used herein, polydodecylbenzene sulfonic acid is the acid obtained by sulfonating polydodecylbenzene. Polydodecylbenzene comprises monoalkylbenzene and dialkylbenzenes in the approximate ratio of 2:3. Its typical physical properties are as follows:

| | |
|---|---|
| Specific gravity at 38° C. | 0.8649 |
| Average molecular weight | 385 |
| Percent sulfonatable | 88 |
| A.S.T.M., D-158 Engler: | |
| I.B.P. °F | 647 |
| 5 °F | 682 |
| 50 °F | 715 |
| 90 °F | 760 |
| 95 °F | 775 |
| F.B.P. °F | 779 |
| Refractive index at 23° C. | 1.4900 |
| Viscosity at | |
| −10° C. centipoises | 2800 |
| 20° C. do | 280 |
| 40° C. do | 78 |
| 80° C. do | 18 |
| Aniline number °C | 69 |
| Pour point °F | −25 |

EXAMPLE I

*Preparation of calcium sulfhydrate*

Materials used:
 3000 grams methanol
 192 grams CaO
 125 grams Hyflo[1]

Procedure:
The materials above were placed in a 5-liter 3-necked flask which was then placed in an ice bath. The mixture was blown with $H_2S$ while maintaining agitation. While blowing with $H_2S$, the temperature should not be allowed to rise above 46° C. The reaction is considered complete when the temperature falls to 6° C. The product is then filtered.

EXAMPLE II

*Preparation of colloidal dispersion of calcium carbonate in calcium sulfonate*

Materials used:
 2927 grams postdodecylbenzene sulfonic acid in naphtha (0.79 milliequivalent per gram—total acidity; 28.7% active)
 3000 ml. benzene
 1641 grams calcium sulfhydrate in methanol (4.2 milliequivalents Ca per gram)
 1608 grams hexa (2-ethyl butoxy) disiloxane ---
[1] Hyflo is a registered trademark for a filter aid made of exceptionally pure diatomaceous silica.

Procedure: The postdodecylbenzene sulfonic acid, calcium sulfhydrate and benzene were added to a suitable reaction vessel. The mixture was blown with carbon dioxide while stirring until essentially all $H_2S$ had been expelled. The hexa (2-ethyl butoxy) disiloxane was added to the reaction vessel. The solvents were removed by heating to 150° C. while blowing with carbon dioxide.

This material had a theoretical composition as follows:

8.4% (weight) $CaCO_3$
32.5% (weight) calcium postdodecylbenzene sulfonate
59.1% (weight) hexa(2-ethyl butoxy) disiloxane

EXAMPLE III

*Preparation of base grease*

Materials used:
A. 206 grams calcium carbonate dispersion (8.5% $CaCO_3$)
  181 grams hexa(2-ethyl butoxy) disiloxane
  200 ml. benzene
B. 19.4 grams itaconic acid
  0.5 ml. water
  20 ml. tertiary butyl alcohol
  25 ml. methanol
  100 ml. acetone
  200 ml. benzene Procedure: The group A materials were added to a Hobart mixer and thoroughly mixed. A solution containing group B materials was then added to the mixer. Agitation was continued and heat applied until the volatile solvents began to reflux. After refluxing the solvents for 45 minutes, they were removed by heating to 292° F. under reduced pressures. Traces of solvents were then removed by heating to 356° F. in the presence of dry nitrogen.

The grease produced was translucent, brown in color, and had a penetration of approximately 300 mm.$\times 10^{-1}$. It had the following composition:

| | Percent |
|---|---|
| Calcium carbonate | 0.65 |
| Calcium itaconate | 6.35 |
| Calcium sulfonate | 11.00 |
| Hexa(2-ethyl butoxy) disiloxane | 82.00 |

Preparation of blended grease: The base grease was blended with 2% dioctyldiphenylamine. This blended grease had the following properties:

A.S.T.M. penetration mm.$\times 10^{-1}$ _ 245.
Oil separation, percent _____ 1.
Dropping point, °F _____ 450+.
Navy gear wear, 5-pound load ___ 2.9 mg./1000 cycles.

EXAMPLE IV

In this example, pyromellitic acid was substituted for the itaconic acid of Example II. Other materials used and the procedure were essentially the same as in Example II. This grease had the following composition:

| | Percent |
|---|---|
| Calcium carbonate | } 7.0 |
| Calcium pyromellitate | |
| Calcium sulfonate | 11.9 |
| Hexa(2-ethyl butoxy) disiloxane | 79.1 |
| Dioctyldiphenylamine | 2.0 |

This grease had the following properties:

A.S.T.M. penetration mm.$\times 10^{-1}$_ 295.
Apparent viscosity —100° F., 16 sec.$^{-1}$, poises _____ 24,849.
Navy gear wear, 5-pound load ___ 2.9 mg./1,000 cycles.

EXAMPLE V

A test was used to screen potential grease-forming agents. The procedure used was to add to colloidal calcium carbonate dispersion (such as in Example II) the appropriate amount of acid necessary for reaction with all of the calcium carbonate present in the dispersion. The mixture was then slowly heated with stirring until gelation occurred. The stability of the resulting gel was determined by working both at room temperature and at 350° F.

In addition to the materials used in Examples III and IV, the following materials were satisfactory:

2-methyl adipic acid
Pyromellitic acid
pyromellitic acid
3-tertiary butyl adipic acid
3-tertiary amyl adipic acid
Octyl adipic acid
Furoic acid
Mercapto succinic acid
2,3-dibromo succinic acid
5-methyl-4-cyclohexane-1,2-dicarboxylic acid
(m-Phenylenedioxy) diacetic acid
Benzylmalonic acid
Terephthalic acid
Thiodiglycolic acid

EXAMPLE VI

Using the test procedure outlined in Example V, the following materials were found to be unsatisfactory as gelling or grease-forming agents:

Myristic acid
Adipic acid
Azelaic acid
Glutaric acid
Sebacic acid
Suberic acid
Malic acid
Acetone dicarboxylic acid
4,5-imidazole dicarboxylic acid
2,5-dihydroxy benzoic acid
Trimesic acid
Aconitic acid
Carboxy-methyl mercapto succinic acid
Nitrilotriacetic acid
1,2,3-propane tricarboxylic acid Examples III and IV have shown that a wide temperature range grease may be prepared by the process of the present invention. Example V has shown that a variety of organic acids can function satisfactorily as grease-forming agents. Example VI, however, has shown that some organic acids will not function as grease-forming agents. The negative results of Example VI indicate generally that straight-chain dicarboxylic acids will not work.

While particular embodiments of the invention have been described, it will be understood, of course, that the invention is not limited thereto, since many modifications may be made; and it is therefore contemplated to cover by the appended claims any such modifications as fall within the true spirit and scope of the invention.

The invention having thus been described, what is claimed and desired to be secured by Letters Patent is:

1. The method of preparing a heat-stable grease which comprises:
(a) forming an alcoholic solution of calcium sulfhydrate by passing hydrogen sulfide through an alcoholic slurry of an inorganic calcium compound selected from the group consisting of calcium oxide, calcium hydroxide, and hydrates of calcium hydroxide;
(b) admixing the resulting alcoholic slurry of calcium sulfhydrate with an oil soluble alkyl aryl sulfonic acid dissolved in an oleaginous vehicle;
(c) condensing from the resulting solution as a stable dispersion an oil insoluble calcium carbonate in particles, the diameters of which are less than .25 micron, by passing carbon dioxide through said solution to convert the calcium sulfhydrate to calcium carbonate;
(d) admixing the resulting dispersion of calcium carbonate with an organic acid selected from the group consisting of itaconic acid, pyromellitic acid, 2-methyl adipic acid, 3-tertiary butyl adipic acid, 3-tertiary amyl adipic acid, octyl adipic acid, furoic acid, mercapto succinic acid, 2,3-dibromo succinic acid, 5-methyl-4-cyclo-hexane-1,2-dicarboxylic acid, (m-phenylenedioxy) diacetic acid, benzylmalonic acid, terephthalic acid, and thiodiglycolic acid, dissolved in a volatile organic solvent for said acid wherein the amount of said acid is equivalent to that which varies from 37 to 85 percent of that theoretically required for the neutralization of said calcium carbonate; and then (e) agitating the resulting mixture while concurrently removing the volatile solvents therefrom.

2. The method as defined in claim 1 wherein the alcohol of step (a) is an aliphatic alcohol containing from 1 to 6 carbon atoms.

3. The method as defined in claim 1 wherein the oleaginous vehicle is selected from the group consisting of mineral lubricating oils, aliphatic diesters, silicone polymers, and silicate esters.

4. The method as defined in claim 1 wherein the volatile organic solvent is selected from the group consisting of aliphatic hydrocarbons, aromatic hydrocarbons, ketones, and alcohols.

5. The method as defined in claim 1 wherein (1) the aliphatic alcohol contains from 1 to 3 carbon atoms, (2) the organic acid is itaconic acid, (3) the oleaginous vehicle is hexa (2-ethyl-butoxy) disiloxane, and (4) the volatile organic solvent is selected from the group consisting of aliphatic hydrocarbons, aromatic hydrocarbons, ketones, and alcohols.

6. The method as defined in claim 1 wherein (1) the aliphatic alcohol contains from 1 to 3 carbon atoms, (2) the organic acid is pyromellitic acid, (3) the oleaginous vehicle is hexa (2-ethylbutoxy) disiloxane, and (4) the volatile organic solvent is selected from the group consisting of aliphatic hydrocarbons, aromatic hydrocarbons, ketones, and alcohols.

7. The method as defined in claim 1 wherein (1) the aliphatic alcohol contains from 1 to 3 carbon atoms, (2) the organic acid is 2-methyl adipic acid, (3) the oleaginous vehicle is hexa (2-ethylbutoxy) disiloxane, and (4) the volatile organic solvent is selected from the group consisting of aliphatic hydrocarbons, aromatic hydrocarbons, ketones, and alcohols.

References Cited in the file of this patent
UNITED STATES PATENTS

| | | |
|---|---|---|
| 2,349,817 | Farrington et al. | May 30, 1944 |
| 2,363,514 | Farrington et al. | Nov. 28, 1944 |
| 2,528,373 | Knowles et al. | Oct. 31, 1950 |
| 2,616,904 | Asseff et al. | Nov. 4, 1952 |
| 2,616,906 | Asseff et al. | Nov. 4, 1952 |